Jan. 20, 1942.　　F. N. LARSON　　2,270,317
AUTOMATIC RELEASE COUPLING
Filed Aug. 20, 1941
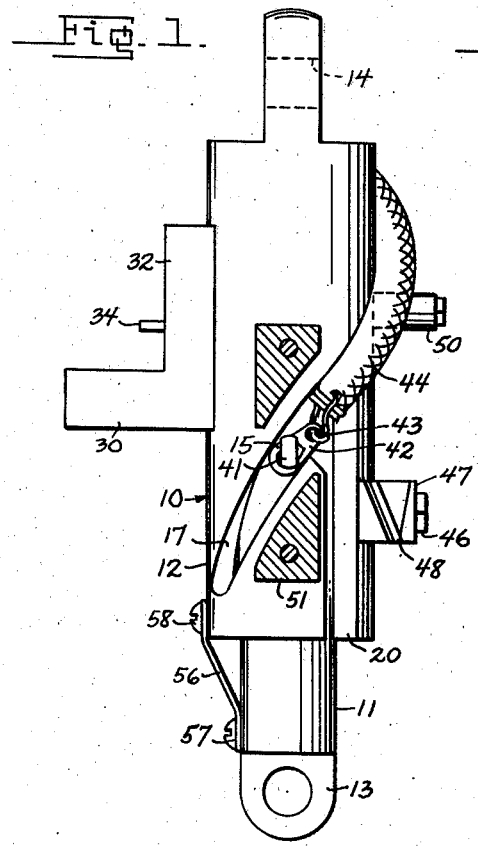
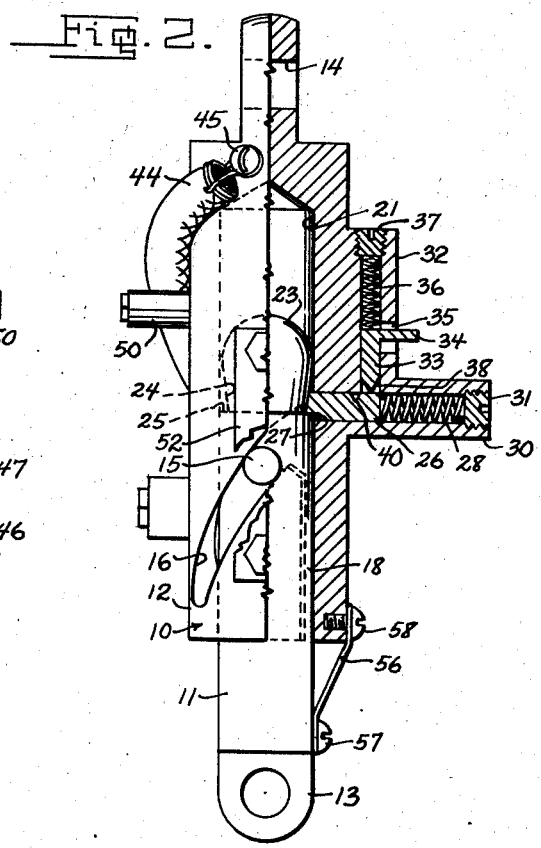
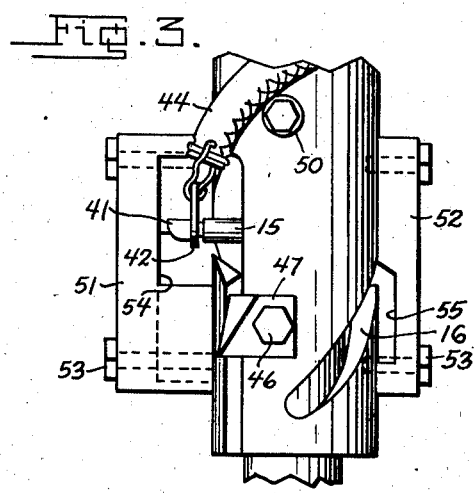
INVENTOR
Frederick N. Larson
BY
ATTORNEY Patented Jan. 20, 1942

2,270,317

UNITED STATES PATENT OFFICE 2,270,317

AUTOMATIC RELEASE COUPLING

Frederick Nelson Larson, United States Navy

Application August 20, 1941, Serial No. 407,588

20 Claims. (Cl. 294—84)

(Granted under the act of March 3, 1883, as amended April 30, 1928; 370 O. G. 757)

This invention relates to an automatic release coupling, and has for an object to provide a coupling on which a load may be safely suspended until it has been lowered to a supporting surface, whereupon the load will be automatically released from the suspending means.

A further object of this invention is to provide an automatic release coupling which will be held positively in assembled position against accidental separation while it is being attached between the load and the suspending means and which, once the suspending means has taken up the load, will hold the load positively, yet will release the load immediately that the load is supported on a suitable surface.

A further object of this invention is to provide a means of visibly indicating that the coupling is still in safe load carrying position, and has not accidentally been moved to load releasing condition, which indicating means also acts as a means to prevent accidental movement of the coupling to load releasing condition.

A further object of this invention is to provide a fracturable, replaceable safety means which, so long as it remains unbroken, indicates that the coupling is in proper usable condition, and at the same time, serves to hold the coupling in such safe usable condition until it has been used for the purpose intended, whereupon the safety means may be inexpensively replaced to allow the coupling to be reassembled for reuse.

One particular use of an invention of this nature is as a coupling means between the parachute and a suspended airplane, person, or other heavy object being lowered from an aircraft. In such uses it is extremely desirable that the load be safely secured to the parachute, yet once the load has landed on its supporting surface, such as on land or water, it is extremely desirable that the parachute be automatically detached from the load so that the load will not be dragged sideways and be injured, particularly in high winds.

It is likewise desirable in the case of lowering of seaplanes or small boats by means of a derrick or davits from a seagoing vessel so that the boat or seaplane will be immediately detached from the davits or derrick once it is supported by the water, thus preventing the boat or seaplane from being accidentally lifted therefrom, as during a heavy sea. This invention is particularly advantageous for these various uses and serves them quite efficiently.

This application is a continuation-in-part of allowed application Ser. No. 361,447 filed October 16, 1940, by the present applicant and abandoned concurrently herewith in favor of the present application.

With the foregoing and other objects in view, the invention consists in the construction, combination and arrangement of parts hereinafter described and illustrated in the drawing, in which:

Fig. 1 is an elevational view of the automatic coupling of this invention;

Fig. 2 is a partly sectional and partly elevational view similar to Fig. 1, but rotated 180 degrees therefrom; and Fig. 3 is a fragmentary view in the direction of arrow 3 of Fig. 1.

There is shown at 10 the automatic coupling of this invention consisting essentially of two principal parts, a plunger 11 and a socket 12, the plunger 11 being provided with a terminal eye 13 to which the airplane, boat or other load is to be secured, while the socket 12 is provided with a terminal eye 14 to which the suspending means of the parachute, derrick or supporting means is to be secured.

Extending transversely through the plunger 11 is the fixed pin 15 which operates in two transversely disposed hook-shaped slots 16 and 17 in socket 12 and which slots connect at their upper ends to the two longitudinally extending slots 18 and 20 extending through the lower end of the socket 12. The interior of the socket 12 is provided with a cylindrical bore 21 extending from adjacent the terminal eye 14 through the opposite end 22, the hook shaped slots and longitudinal slots all connecting through to this cylindrical bore 21, the internal diameter of this cylindrical bore 21 being equal to or slightly greater than the external diameter of the plunger 11. The upper end of the plunger 11 is provided with a dome shaped head 23 terminating in a reduced neck 24, thereby providing a shoulder 25, the maximum diameter of the head 23 being equal to the diameter of the plunger 11.

Extending through one side of the socket 12 is a catch 26 terminating in a notched finger 27 adapted to cooperate with the shoulder 25 and prevent further movement of the plunger 11 into the bore 21 while it its held in this position by means of a spring 28 within a hollowed boss 30 into which is threaded a plug 31 acting as a base for the spring 28. Extending along the side of the socket 12 at right angles to and intersecting the hollow in the boss 30 is a hollowed rib 32 in which is a pin 33 having a finger 34 extending through a slot 35 in the rib 32. A spring 36 placed between the end of the pin 33 and a plug 37 in the end of hollowed rib 32 serves to urge the pin 33 downwardly. This pin 33 is provided with a V-shaped terminal 38 adapted to cooperate with a V-shaped notch 40 in the spring-loaded catch 26. Partial withdrawal of the plunger 11 to the point where the maximum diameter of the head 23 abuts against the end of the notched finger 27 will push this finger 27 back against the spring 28, whereupon the spring loaded pin 33 pushed by the spring 36 will cause its point 38 to enter the notch 40 and thus hold the catch 26 disengaged from the shoulder 35 of plunger 11, leaving the plunger 11 free to move inwardly beyond this point.

One end of the fixed pin 15 is provided with an upwardly extending hooked terminus 41 which serves to removably receive an eye 42, this eye 42 having a small aperture 43 which cooperates with the end of an unlocking rubber spring 44, the other end of spring 44, curving about the outside of socket 12 over spring guide 50, being secured by an anchor stud 45. Also secured to the socket 12 adjacent about the midpoint of the longitudinal slot 20 as by a stud 46 is a tripper block 47 having a beveled edge 48 extending in the path of the edge of the removable eye 42 as it moves downwardly along the slot 20. To insure the proper assembly of the plunger 11 in the socket 12 so that the hooked terminus 41 of the fixed pin 15 will be in the slot 20 adjacent tripper 47, this end of the fixed pin 15 and the slot 20 are of slightly different diameter and width than the other end of fixed pin 15 and the longitudinal slot 18.

Bridged across the hook shaped slots 16 and 17 are the reinforcing guards 51 and 52 secured to the socket 12 by studs 53. Each of these reinforcing guards 51 and 52 is provided with undercut passages 54 and 55 extending over the slots 16 and 17, permitting free passage of the fixed pin 15, it being noted that the reinforcing guard 51 is of a sufficient size so that the undercut passageway 54 therein permits the hooked terminus 41 to pass thereunder without interference. As a result of the presence of these bridging reinforcing guards 51 and 52, the path of the pin 15 in the slots 16 and 17 is guarded against interference, and in addition those portions of the socket 12 that are cut almost into triangles by the presence of the hooked slots 16 and 17 and the longitudinal slots 18 and 20 are reinforced and supported against the possibility of their bending in operation under the pressure of the pin 15 in the hooked end of the slots 16 and 17, thereby insuring that the longitudinal slots 18 and 20 will not be distorted to block off the escape of the pin 15 therethrough as the coupling 10 separates into the two portions, the plunger 11 and the socket 12.

In order to visibly indicate that the coupling has not been prematurely operated to release the catch from behind the shoulder 26, and in order to also prevent such premature operation, there is provided a fracturable and safety indicating means consisting of a wire 56 replaceably secured at one end by a screw 57 to the plunger 11 and at its other end by a screw 58 to the socket 12 adjacent its end 22. The wire 56 is of such length that it will be taut while the catch 26 is against the shoulder 25, but will fracture as soon as the plunger 11 has moved pin 15 along slot 16 sufficiently to cause plunger head 23 to move catch 26 to the retracted position. The wire 56 will be of such strength that it will break when the plunger 11 pulls the pin 15 down slot 16 under the weight of the supported load, but it will not break under any substantially lesser load or under manual handling, either when stowing the coupling, or when attaching the coupling into the load supporting line.

In operation, the parachute straps, derrick hook or davit hook will be secured through the terminal eye 14 while the parachute harness load or boat will be secured to the terminal eye 13, the coupling 10 having first been assembled into the position shown in Fig. 2, with the unbroken wire 56 showing that the coupling is in safe usable condition. While no load or strain is placed on the coupling it will remain in this position with the unlocking spring 44 holding the plunger 11 with its shoulder 25 abutting against the spring loaded catch 26. When the load is first placed on the plunger 11, the safety wire 56 breaks and the plunger 11 will travel outwardly of the bore 21 while the ends of the fixed pin 15 travel to the end of the hooked slots 16 and 17, taking up the weight of the load. Meantime, the dome head 23 of plunger 11 passes the spring-loaded catch 26, and as it does so, it pushes back the catch until the spring-loaded pin 33 moves its point 38 into the V-shaped notch 40 of the catch 26, thus holding this catch in retracted position with its hooked end 27 out of the path of the shoulder 25. As soon as the load or boat is supported by a suitable surface, the weight on the plunger 11 is relieved, whereupon the spring 44 will pull the plunger 11 into the bore 21, rotating it meantime so as to bring the ends of the fixed pin 15 out of the slots 16 and 17 and into the longitudinal slots 18 and 20. Then if the parachute starts to blow or the derrick or davits start to raise up, the load coming on again will cause the plunger 11 to again commence to leave the bore 21, this time, however, with the ends of the fixed pin 15 in the longitudinal slots 18 and 20 which extend through the ends of the socket. As the ends of the fixed pin 15 travel down the longitudinal slots, the removable eye 42 will pass over the bevel 48 of the tripper block 47, being thereby detached therefrom, thus completely releasing the plunger 11 from any mechanical connection whatsoever to the socket 12 and permitting them to separate immediately, thus relieving the load of any further pull from the suspension means.

Obviously, if the material of which the coupling is composed is sufficiently strong, slots 16 and 18 and that end of pin 15 which travels in slots 16 and 18 may be omitted without affecting the construction and operation of the invention.

Other modifications and changes in the number and arrangements of the parts may be made by those skilled in the art without departing from the nature of the invention, within the scope of what is hereinafter claimed.

The invention described herein may be manufactured and used by and for the Government of the United States of America for governmental purposes without the payment of any royalties thereon or therefor.

What is claimed is:

1. An automatic load releasing coupling comprising a bored socket means and a plunger means extendable into the bore of said socket means, a terminal means on each of said socket means and said plunger means, one of said terminal means being adapted to be secured to a load and the other of said terminal means being adapted to be secured to a suspending means, longitudinal slot means extending into said socket means from the bored end thereof, hooked slot means in said socket means connecting to said longitudinal slot means at a point spaced from the end of said socket means, means extending from the side of said plunger means adapted to travel along said slot means, said extending means holding said plunger and socket means in assembled relation while it is in said hooked slot means and means preventing said plunger from moving in said socket until a predetermined stress thereon is exceeded, said preventing means including a visible safety indicating member.

2. An automatic load releasing coupling comprising a bored socket means and a plunger means extendable into the bore of said socket means, a terminal means on each of said socket means and said plunger means, one of said terminal means being adapted to be secured to a load and the other of said terminal means being adapted to be secured to a suspending means, longitudinal slot means extending into said socket means from the bored end thereof, hooked slot means in said socket means connecting to said longitudinal slot means at a point spaced from the end of said socket means, means extending from the side of said plunger means adapted to travel along said slot means, said extending means holding said plunger and socket means in assembled relation while it is in said hooked slot means and means preventing said plunger from moving in said socket until a predetermined stress thereon is exceeded, said preventing means including a visible safety indicating member, said visible safety member being breakable when said predetermined stress is exceeded, releasing said plunger for movement.

3. An automatic load releasing coupling comprising a bored socket means and a plunger means extendable into the bore of said socket means, a terminal means on each of said socket means and said plunger means, one of said terminal means being adapted to be secured to a load and the other of said terminal means being adapted to be secured to a suspending means, longitudinal slot means extending into said socket means from the bored end thereof, hooked slot means in said socket means connecting to said longitudinal slot means at a point spaced from the end of said socket means, means extending from the side of said plunger means adapted to travel along said slot means, said extending means holding said plunger and socket means in assembled relation while it is in said hooked slot means, and yieldable means releasably secured between said socket means and said extending means on said plunger means normally urging said extending means from said hooked slot to said longitudinal slot means.

4. An automatic load releasing coupling comprising a bored socket means and a plunger means extendable into the bore of said socket means, a terminal means on each of said socket means and said plunger means, one of said terminal means being adapted to be secured to a load and the other of said terminal means being adapted to be secured to a suspending means, longitudinal slot means extending into said socket means from the bored end thereof, hooked slot means in said socket means connecting to said longitudinal slot means at a point spaced from the end of said socket means, means extending from the side of said plunger means adapted to travel along said slot means, said extending means holding said plunger and socket means in assembled relation while it is in said hooked slot means, yieldable means releasably secured between said socket means and said extending means on said plunger means normally urging said extending means from said hooked slot means to said longitudinal slot means, and catch means extending through the side of said socket means cooperating with said plunger means to hold said plunger means against the action of said releasably secured yieldable means.

5. An automatic load releasing coupling comprising a bored socket means and a plunger means extendable into the bore of said socket means, a terminal means on each of said socket means and said plunger means, one of said terminal means being adapted to be secured to a load and the other of said terminal means being adapted to be secured to a suspending means, longitudinal slot means extending into said socket means from the bored end thereof, hooked slot means in said socket means connecting to said longitudinal slot means at a point spaced from the end of said socket means, means extending from the side of said plunger means adapted to travel along said slot means, said extending means holding said plunger and socket means in assembled relation while it is in said hooked slot means, yieldable means releasably secured between said socket means and said extending means on said plunger means normally urging said extending means from said hooked slot means to said longitudinal slot means, means preventing said plunger from moving in said socket until a predetermined stress thereon is exceeded, said preventing means including a visible safety indicating member, and catch means extending through the side of said socket means cooperating with said plunger means to hold said plunger means against the action of said releasably secured yieldable means.

6. An automatic load releasing coupling comprising a bored socket means and a plunger means extendable into the bore of said socket means, a terminal means on each of said socket means and said plunger means, one of said terminal means being adapted to be secured to a load and the other of said terminal means being adapted to be secured to a suspending means, longitudinal slot means extending into said socket means from the bored end thereof, hooked slot means in said socket means connecting to said longitudinal slot means at a point spaced from the end of said socket means, means extending from the side of said plunger means adapted to travel along said slot means, said extending means holding said plunger and socket means in assembled relation while it is in said hooked slot means, yieldable means releasably secured between said socket means and said extending means on said plunger means normally urging said extending means from said hooked slot means to said longitudinal slot means, catch means extending through the side of said socket means cooperating with said plunger means to hold said plunger means against the action of said releasably secured yieldable means, means formed on said socket means for moving said catch means out of cooperative engagement with said plunger means as said plunger means takes up the load in operation, and means for holding said catch means in inoperative position.

7. An automatic load releasing coupling comprising a bored socket means and a plunger means extendable into the bore of said socket means, a terminal means on each of said socket means and said plunger means, one of said terminal means being adapted to be secured to a load and the other of said terminal means being adapted to be secured to a suspending means, longitudinal slot means extending into said socket means from the bored end thereof, hooked slot means in said socket means connecting to said longitudinal slot means at a point spaced from the end of said socket means, means extending from the side of said plunger means adapted to travel along said slot means, said extending means holding said plunger and socket means in assembled relation while it is in said hooked slot means, yieldable means releasably secured between said socket means and said extending means on said plunger means normally urging said extending means from said hooked slot means to said longitudinal slot means, catch means extending through the side of said socket means cooperating with said plunger means to hold said plunger means against the action of said releasably secured yieldable means, means formed on said socket means for moving said catch means out of cooperative engagement with said plunger means as said plunger means takes up the load in operation, means for holding said catch means in inoperative position, and means in the path of said yieldable means for releasing said yieldable means as the extending means travels down said longitudinal slot means.

8. An automatic load releasing coupling comprising a male member and a female member, one of said members being adapted to be attached to a load and the other of said members being adapted to be attached to a suspending means, slot means extending into said female member through the open end thereof and terminating in a reverse hook shaped portion, means extending from a side of said male member adapted to travel through said slot means into said hook shaped portion to load-supporting position and then out through said open end portion to release the load, and means preventing said plunger from moving in said socket until a predetermined stress thereon is exceeded, said preventing means including a visible safety indicating member.

9. An automatic load releasing coupling comprising a male member and a female member, one of said members being adapted to be attached to a load and the other of said members being adapted to be attached to a suspending means, slot means extending into said female member through the open end thereof and terminating in a reverse hook shaped portion, means extending from a side of said male member adapted to travel through said slot means into said hook shaped portion to load-supporting position and then out through said open end portion to release the load, and means preventing said plunger from moving in said socket until a predetermined stress thereon is exceeded, said preventing means including a visible safety indicating member, said visible safety member being breakable when said predetermined stress is exceeded, releasing said plunger for movement.

10. An automatic load releasing coupling comprising a male member and a female member, one of said members being adapted to be attached to a load and the other of said members being adapted to be attached to a suspending means, slot means extending into said female member through the open end thereof and terminating in a reverse hook shaped portion, means extending from a side of said male member adapted to travel through said slot means into said hook shaped portion to load-supporting position and then out through said open end portion to release the load, and yieldable means urging said male member into said female member to move said extending means out of said hook shaped portion of said slot means.

11. An automatic load releasing coupling comprising a male member and a female member, one of said members being adapted to be attached to a load and the other of said members being adapted to be attached to a suspending means, slot means extending into said female member through the open end thereof and terminating in a reverse hook shaped portion, means extending from a side of said male member adapted to travel through said slot means into said hook shaped portion to load-supporting position and then out through said open end portion to release the load, yieldable means urging said male member into said female member to move said extending means out of said hook shaped portion of said slot means, and catch means extending into the path of said male member resisting the movement of said male member into said female member to hold said extending means at an intermediate position in said hook shaped portion of said slot means.

12. An automatic load releasing coupling comprising a male member and a female member, one of said members being adapted to be attached to a load and the other of said members being adapted to be attached to a suspending means, slot means extending into said female member through the open end thereof and terminating in a reverse hook shaped portion, means extending from a side of said male member adapted to travel through said slot means into said hook shaped portion to load-supporting position and then out through said open end portion to release the load, yieldable means urging said male member into said female member to move said extending means out of said hook shaped portion of said slot means, means preventing said plunger from moving in said socket until a predetermined stress thereon is exceeded, said preventing means including a visible safety indicating member, and catch means extending into the path of said male member resisting the movement of said male member into said female member to hold said extending means at an intermediate position in said hook shaped portion of said slot means.

13. An automatic load releasing coupling comprising a male member and a female member, one of said members being adapted to be attached to a load and the other of said members being adapted to be attached to a suspending means, slot means extending into said female member through the open end thereof and terminating in a reverse hook shaped portion, means extending from a side of said male member adapted to travel through said slot means into said hook shaped portion to load-supporting position and then out through said open end portion to release the load, yieldable means urging said male member into said female member to move said extending means out of said hook shaped portion of said slot means, means preventing said plunger from moving said socket until a predetermined stress thereon is exceeded, said preventing means including a visible safety indicating member, said visible safety member being breakable when said predetermined stress is exceeded, releasing said plunger for movement, and catch means extending into the path of said male member resisting the movement of said male member into said female member to hold said extending means at an intermediate position in said hook shaped portion of said slot means.

14. An automatic load releasing coupling comprising a male member and a female member, one of said members being adapted to be attached to a load and the other of said members being adapted to be attached to a suspending means, slot means extending into said female member through the open end thereof and terminating in a reverse hook shaped portion, means extending from a side of said male member adapted to travel through said slot means into said hook shaped portion to load-supporting position and then out through said open end portion to release the load, yieldable means urging said male member into said female member to move said extending means out of said hook shaped portion of said slot means, catch means extending into the path of said male member resisting the movement of said male member into said female member to hold said extending means at an intermediate position in said hook shaped portion of said slot means, means formed on said male member cooperating with said catch means and additional means formed on said male member moving said catch means into inoperative position as said extending portion is withdrawn to the hook end of said hook portion of said slot means as a load is supported on said coupling, and latch means for holding said catch means in inoperative position.

15. An automatic load releasing coupling comprising a male member and a female member, one of said members being adapted to be attached to a load and the other of said members being adapted to be attached to a suspending means, slot means extending into said female member through the open end thereof and terminating in a reverse hook shaped portion, means extending from a side of said male member adapted to travel through said slot means into said hook shaped portion to load-supporting position and then out through said open end portion to release the load, yieldable means urging said male member into said female member to move said extending means out of said hook shaped portion of said slot means, catch means extending into the path of said male member resisting the movement of said male member into said female member to hold said extending means at an intermediate position in said hook shaped portion of said slot means, means formed on said male member cooperating with said catch means, additional means formed on said male member moving said catch means into inoperative position as said extending portion is withdrawn to the hook end of said hook portion of said slot means as a load is supported on said coupling, latch means for holding said catch means in inoperative position, separable means securing said yieldable means to one of said members, and a tripper means in the path of said separable means for separating said yieldable means from one of said members after said extending means has moved out of the hook shaped portion of said slot means.

16. An automatic load releasing coupling comprising a male member and a female member, one of said members being adapted to be attached to a load and the other of said members being adapted to be attached to a suspending means, slot means extending into said female member through the open end thereof and terminating in a reverse hook shaped portion, means extending from a side of said male member adapted to travel through said slot means into said hook shaped portion to load-supporting position and then out through said open end portion to release the load, yieldable means urging said male member into said female member to move said extending means out of said hook shaped portion of said slot means, means preventing said plunger from moving in said socket until a predetermined stress thereon is exceeded, said preventing means including a visible safety indication member and catch means extending into the path of said male member resisting the movement of said male member into said female member to hold said extending means at an intermediate position in said hook shaped portion of said slot means, means formed on said male member cooperating with said catch means, additional means formed on said male member moving said catch means into inoperative position as said extending portion is withdrawn to the hook end of said hook portion of said slot means as a load is supported on said coupling, latch means for holding said catch means in inoperative position, separable means securing said yieldable means to one of said members, and a tripper means in the path of said separable means for separating said yieldable means from one of said members after said extending means has moved out of the hook shaped portion of said slot means.

17. An automatic load releasing coupling comprising a male member and a female member, one of said members being adapted to be attached to a load and the other of said members being adapted to be attached to a suspending means, slot means extending into said female member through the open end thereof and terminating in a reverse hook shaped portion, means extending from a side of said male member adapted to travel through said slot means into said hook shaped portion to load-supporting position and then out through said open end portion to release the load, yieldable means urging said male member into said female member to move said extending means out of said hook shaped portion of said slot means, means preventing said plunger from moving in said socket until a predetermined stress thereon is exceeded, said preventing means including a visible safety indicating member, said visible safety member being breakable when said predetermined stress is exceeded, releasing said plunger for movement, and catch means extending into the path of said male member resisting the movement of said male member into said female member to hold said extending means at an intermediate position in said hook shaped portion of said slot means, means formed on said male member cooperating with said catch means, additional means formed on said male member moving said catch means into inoperative position as said extending portion is withdrawn to the hook end of said hook portion of said slot means as a load is supported on said coupling, latch means for holding said catch means in inoperative position, separable means securing said yieldable means to one of said members, and a tripper means in the path of said separable means for separating said yieldable means from one of said members after said extending means has moved out of the hook shaped portion of said slot means.

18. An automatic load releasing coupling comprising a bored socket means and a plunger means extendable into the bore of said socket means, a terminal means on each of said socket means and said plunger means, one of said terminal means being adapted to be secured to a load and the other of said terminal means being adapted to be secured to a suspending means, longitudinal slot means extending into said socket means from the bored end thereof, hooked slot means in said socket means connecting to said longitudinal slot means at a point spaced from the end of said socket means, means extending from the side of said plunger means adapted to travel along said slot means, said extending means holding said plunger and socket means in assembled relation while it is in said hooked slot means, and bridging reinforcing means extending across said hooked slot means and secured to said socket means to prevent distortion of said longitudinal slot means.

19. An automatic load releasing coupling comprising a bored socket means and a plunger means extendable into the bore of said socket means, a terminal means on each of said socket means and said plunger means, one of said terminal means being adapted to be secured to a load and the other of said terminal means being adapted to be secured to a suspending means, longitudinal slot means extending into said socket means from the bored end thereof, hooked slot means in said socket means connecting to said longitudinal slot means at a point spaced from the end of said socket means, means extending from the side of said plunger means adapted to travel along said slot means, said extending means holding said plunger and socket means in assembled relation while it is in said hooked slot means, and means preventing said plunger from moving in said socket until a predetermined stress thereon is exceeded.

20. An automatic load releasing coupling comprising a bored socket means and a plunger means extendable into the bore of said socket means, a terminal means on each of said socket means and said plunger means, one of said terminal means being adapted to be secured to a load and the other of said terminal means being adapted to be secured to a suspending means, longitudinal slot means extending into said socket means from the bored end thereof, hooked slot means in said socket means connecting to said longitudinal slot means at a point spaced from the end of said socket means, means extending from the side of said plunger means adapted to travel along said slot means, said extending means holding said plunger and socket means in assembled relation while it is in said hooked slot means, and means preventing said plunger from moving in said socket until a predetermined stress thereon is exceeded, said preventing means including a visible safety indicating member, said visible safety member being breakable when said predetermined stress is exceeded, releasing said plunger for movement.

FREDERICK NELSON LARSON.